US011790165B2

(12) United States Patent
Wilde et al.

(10) Patent No.: US 11,790,165 B2
(45) Date of Patent: Oct. 17, 2023

(54) CONTENT ELEMENT RECOMMENDATION SYSTEM

(71) Applicant: Microsoft Technology Licensing, LLC, Redmond, WA (US)

(72) Inventors: Benjamin Gustav Wilde, Quincy, MA (US); Ransom Lloyd Richardson, Acton, MA (US); Richard Malcolm Banks, Chertsey (GB); Manoj Sharma, Winchester, MA (US); Zeyu Wu, Cambridge, MA (US); Matthew Stephen Howard, Cambridge, MA (US); Sudarshan Sundar, Cambridge, MA (US); Lyndsy Marie Stopa, Lancaster, NY (US); Yi Zheng, Waltham, MA (US); Jacob Lee Sanchez, Lincoln, NE (US); Aleksandr Polyakov, Cambridge, MA (US); Jason Peter Campoli, Boston, MA (US); Gregory Alan Howard, Kirkland, WA (US); Paul Anthony Scudieri, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/214,518

(22) Filed: Mar. 26, 2021

(65) Prior Publication Data

US 2022/0237374 A1     Jul. 28, 2022

Related U.S. Application Data

(60) Provisional application No. 63/141,847, filed on Jan. 26, 2021.

(51) Int. Cl.
    *G06F 3/0482*      (2013.01)
    *G06F 16/33*      (2019.01)
    *G06F 40/205*      (2020.01)

(52) U.S. Cl.
    CPC ........ *G06F 40/205* (2020.01); *G06F 16/3344* (2019.01); *G06F 3/0482* (2013.01)

(58) Field of Classification Search
    CPC ... G06F 3/0482; G06F 16/3344; G06F 40/205
    See application file for complete search history.

(56) References Cited

U.S. PATENT DOCUMENTS 6,167,370 A * 12/2000 Tsourikov ............. G06F 40/221
    715/219
8,959,109 B2 * 2/2015 Scott ..................... G06F 16/332
    707/769

(Continued)

OTHER PUBLICATIONS

"International Search Report and Written Opinion Issued in PCT Application No. PCT/US22/011507", dated Apr. 8, 2022, 9 Pages.

(Continued)

*Primary Examiner* — Shourjo Dasgupta
(74) *Attorney, Agent, or Firm* — Schwegman Lundberg & Woessner, P.A.

(57) ABSTRACT

A system and method for identifying relevant content from other documents and presenting candidate documents/content in a document authoring application is described. A computer-implemented method includes performing an analysis of text of a document being authored by a user with a document authoring application, searching a document library for content elements and documents based on the analysis of the text, identifying candidate documents and candidate content based on the searching, presenting a list of candidate documents or candidate content with the document authoring application, receiving a selection of a candidate document or candidate content from the list in the (Continued)

document authoring application, and including an instance of the selected candidate document or candidate content in the document.

19 Claims, 16 Drawing Sheets

(56) References Cited

U.S. PATENT DOCUMENTS

| | | | |
|---|---|---|---|
| 9,501,490 B2 | 11/2016 | Evans et al. | |
| 9,881,010 B1* | 1/2018 | Gubin | G06F 16/93 |
| 10,108,615 B2* | 10/2018 | Masson | G06F 40/274 |
| 10,394,949 B2 | 8/2019 | Chilakamarri et al. | |
| 11,307,881 B1* | 4/2022 | Bhutani | G06F 9/453 |
| 2009/0217196 A1* | 8/2009 | Neff | G06Q 10/10 715/799 |
| 2010/0030764 A1* | 2/2010 | Koren | G06F 16/435 705/7.29 |
| 2011/0113320 A1* | 5/2011 | Neff | G06Q 10/10 707/827 |
| 2012/0278707 A1* | 11/2012 | Kadowaki | G06F 40/268 715/255 |
| 2014/0040238 A1* | 2/2014 | Scott | G06F 16/332 707/769 |
| 2014/0282921 A1 | 9/2014 | Filman et al. | |
| 2014/0372933 A1* | 12/2014 | Shirolkar | G06F 40/18 715/780 |
| 2015/0199345 A1* | 7/2015 | Joshi | G06F 40/166 707/723 |
| 2015/0215371 A1 | 7/2015 | Zamir | |
| 2016/0072772 A1 | 3/2016 | Geigel et al. | |
| 2016/0092404 A1* | 3/2016 | Farouki | G06F 9/451 715/202 |
| 2016/0092405 A1* | 3/2016 | Lee | G06F 9/451 715/202 |
| 2016/0092419 A1* | 3/2016 | Farouki | G06F 40/169 715/202 |
| 2016/0092428 A1* | 3/2016 | Ilic | G06F 3/04847 715/765 |
| 2016/0148280 A1* | 5/2016 | Marth | G06Q 30/0269 705/14.42 |
| 2017/0031575 A1* | 2/2017 | Dotan-Cohen | G06F 3/04842 |
| 2017/0154188 A1* | 6/2017 | Meier | G06F 21/552 |
| 2017/0300535 A1* | 10/2017 | Papineni | G06F 16/9535 |
| 2018/0052587 A1* | 2/2018 | LaPier | G06F 40/169 |
| 2018/0189289 A1* | 7/2018 | Wexler | G06F 16/9535 |
| 2018/0341638 A1* | 11/2018 | Beriwal | G06F 40/166 |
| 2018/0349517 A1* | 12/2018 | Kleiman-Weiner | G06F 16/9535 |
| 2018/0352373 A1* | 12/2018 | Sahadi | H04W 4/021 |
| 2018/0365325 A1* | 12/2018 | Gireesha | G06F 16/38 |
| 2019/0107940 A1 | 4/2019 | Wynne et al. | |
| 2019/0138611 A1* | 5/2019 | Gines Marin | G06F 16/337 |
| 2019/0138637 A1 | 5/2019 | Hogan et al. | |
| 2019/0243890 A1* | 8/2019 | Kwatra | G06N 3/08 |
| 2019/0392049 A1 | 12/2019 | Estes et al. | |
| 2020/0125575 A1* | 4/2020 | Ghoshal | G06F 40/247 |
| 2020/0293607 A1* | 9/2020 | Nelson | G06F 40/30 |
| 2021/0117714 A1 | 4/2021 | Yang et al. | |
| 2021/0125108 A1 | 4/2021 | Metzler et al. | |
| 2022/0171823 A1* | 6/2022 | Kwatra | G06F 16/9535 |

OTHER PUBLICATIONS

"Notice of Allowance Issued in U.S. Appl. No. 16/655,422", dated Jan. 12, 2023, 11 Pages.

"LightGBM", Retrieved from: https://lightgbm.readthedocs.io/en/latest/, Retrieved Date: Jul. 15, 2019, 2 Pages.

"Non Final Office Action Issued in U.S. Appl. No. 16/655,422", dated Sep. 1, 2022, 26 Pages.

Jeannette, Gribble, "Microsoft Word 2013: Inserting File Name, Document Title, Author & Other Property Details into a Document", Retrieved From : https://www.dickinson.edu/download/downloads/id/2532/word_insert_path_doc_property_, Dec. 11, 2013, 1 Page.

"Notice of Allowance Issued in U.S. Appl. No. 16/655,422", dated Aug. 2, 2023, 8 Pages.

* cited by examiner

CONTENT ELEMENT RECOMMENDATION SYSTEM

CROSS-REFERENCE

The present application claims priority from U.S. Provisional Patent Application Ser. No. 63/141,847, filed on Jan. 26, 2021, and incorporated in its entirety herewith.

BACKGROUND

The subject matter disclosed herein generally relates to a special-purpose machine that analyzes a user's document and provides candidates content from other documents in a user interface element. Specifically, the present disclosure addresses systems and methods for identifying and displaying dynamic candidate content pertinent to a document present in a document authoring application.

A document authoring application (e.g., Microsoft Word™ or any application from Microsoft Office™) is typically used to author a document and provides the user with a list of recent files accessed by the document authoring application. The list of recent files may not always be relevant to the user. As such, the user may have to manually search through folders to identify content from previously generated documents that may be relevant to the document currently present in the document authoring application.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
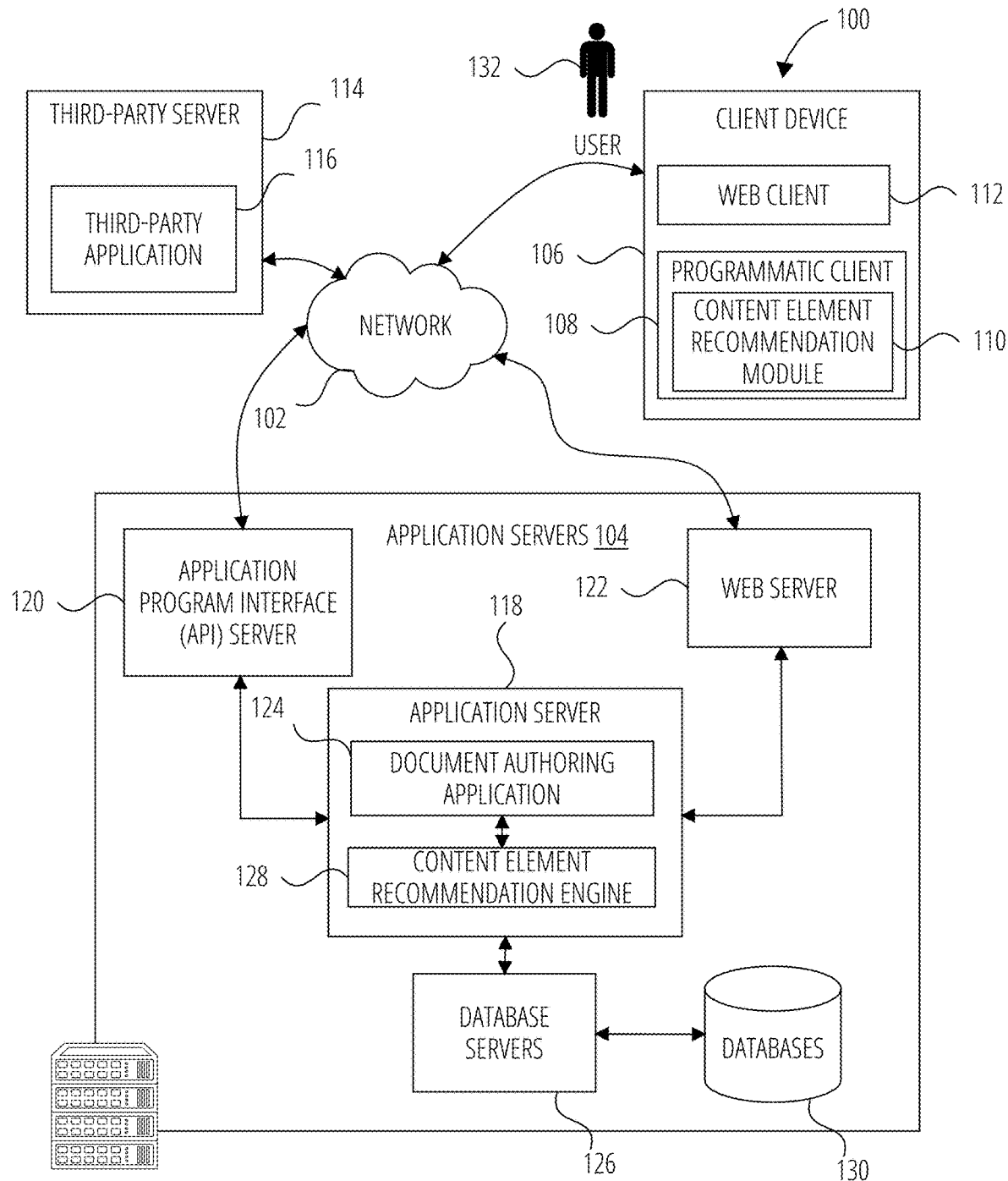
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a system and method for identifying and suggesting previously saved documents and content of documents that are pertinent to a user of a document authoring application (e.g., Microsoft Word™, Microsoft PowerPoint™). In one example, the system identifies content (from other documents previously authored, edited, shared by the user, or shared with the user, accessible to the user) with a high likelihood that the user will reuse the identified content in a document present in the document authoring application. The system then presents a list of suggested documents, dynamic real-time synced content from documents/content in a user interface element of the document authoring application. The suggested content is not limited to content from documents. The suggested content can also include any content or data that is pertinent or relevant to the content being edited or authored by the user. Examples of suggested content include but are not limited to information about related person or resources, information from the web, previous decisions from workflow processes, tasks, whiteboards, extracts from meetings, emails, chat conversations, links to a document, embedded version of a document (or a piece thereof).

In one example embodiment, the suggestion system operates in an implicit mode: the system analyzes, in real-time, words and phrases as a user types in the document authoring application. The system surfaces relevant documents/content to the user as the user types. In another example embodiment, the suggestion system operates in an explicit mode: the system detects a trigger (e.g., a preset key on a keyboard) from the user. In response to the trigger, the system analyzes the last words and phrases typed by the user in the document authoring application. The system then surfaces relevant documents/content.

In one example embodiment, the suggestion system accesses a number of signals to evaluate relevant documents/content of documents from a library of documents (e.g., of the same or different types—for example, Word documents, Excel documents, PowerPoint documents) and computes a relevance score for each document/content. Examples of signals include, but are not limited to, metadata of the documents, keywords in the documents, author of the documents, profile of the author of the documents, last accessed time of a document, document creation time, document file size and file type, timestamp a document was shared with the user, whether the document is located in a public or favorite folder, and timestamp of the last access by the user. In another example embodiment, the suggestion system includes a machine learning model based on the above signals to predict relevant documents.

In one example embodiment, the system generates a document relevance score for each document, and a content relevance score for content in a document. The document/content relevance scores are computed, for example, using machine learning, where the feature inputs include: the file name, title, and an n-character neighborhood around the insertion point (from the document present in the document authoring application), and the file name, title, document summary, type of file, and relevant content (for each candidate document).

In one example, the user belongs to an enterprise. The enterprise represents an organization or groups of users associated with an organization. The users of the enterprise may make use of enterprise applications operating on client machines. Examples of enterprise applications include chat-based applications, email applications, document authoring applications, document editing applications, document viewing applications, document sharing applications, and other types of applications used by enterprises.

In one example embodiment, a system and method for identifying relevant content from other documents and presenting candidate documents/content in a document authoring application is described. A computer-implemented method includes performing an analysis of text of a document being authored by a user with a document authoring application, searching a document library for content elements and documents based on the analysis of the text, identifying candidate documents and candidate content based on the searching, presenting a list of candidate documents or candidate content with the document authoring application, receiving a selection of a candidate document or candidate content from the list in the document authoring application, and including an instance of the selected candidate document or candidate content in the document.

In another example, the method further comprises: including a reference (or active link) of the selected candidate document. The reference causes a dynamic display of the selected candidate document. The reference or instance of the document may also be referred to as a Fluid Component™, a product of Microsoft Inc. The Fluid Component includes for example, text, tables, charts, and task lists. The Fluid Component can be inserted into emails, documents, and chats. The permissions and access are handled automatically based on access permission to the Fluid Component.

Because Fluid Components stay updated no matter where they are hosted across different service applications (e.g., Microsoft Word, Microsoft Excel, Microsoft PowerPoint), the information stays updated and relevant. But, unlike a document, a Fluid Component is "a little atomic unit of productivity" and fully rendered inline. The user 132 does not need to click on the Fluid Component to open up the corresponding content in another browser tab. The entire Fluid Component is displayed in context in the document authoring application 124 and the user can immediately start editing the Fluid Component. Edits to Fluid Component by several users are synchronized in near real-time across all different service applications used to edit/view the same fluid Component.

As a result, one or more of the methodologies described herein facilitate solving the technical problem of searching for items that a user may not be aware. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a networked environment 100 in which some example embodiments of the present disclosure may be implemented or deployed. One or more application servers 104 provide server-side functionality via a network 102 to a networked user device, in the form of a client device 106. A user 132 operates the client device 106. The client device 106 includes a web client 112 (e.g., a browser operating a web version of an enterprise application), a programmatic client 108 (e.g., a client-side enterprise document application such as Microsoft PowerPoint™) that is hosted and executed on the client device 106. In one example embodiment, the programmatic client 108 includes a content element recommendation module 110 that identifies candidate documents with a high likelihood that the user 132 will incorporate into a document present (e.g., being authored or edited) in the programmatic client 108 (or the web client 112).

For example, the content element recommendation module 110 generates a display of a user interface element (e.g., pane pop-up) that includes candidate documents (e.g., recommended or suggested documents, or relevant content from other documents) in the graphical user interface of the programmatic client 108. The candidate documents may include a set of documents from a library of documents. The library of documents may include documents that have been previously edited, accessed, authored, shared with or by the user 132. The library of documents may be stored in databases 130.

In one example, the content element recommendation module 110 detects that the user 132 has opened the programmatic client 108. The content element recommendation module 110 identifies candidate documents based on a profile of the user 132 (e.g., user 132 is a new accountant), events of the programmatic client 108 (e.g., words/phrases just typed by the user 132), and attributes of documents in the library of documents (e.g., most opened documents from new accounting employees on the first day of their job).

In another example embodiment, the content element recommendation module 110 detects that the user 132 is writing content for a new document. The content element recommendation module 110 identifies the content written by the user 132 in the programmatic client 108. The content element recommendation module 110 uses the identified content to identify candidate documents that the user 132 will most likely reuse portions of the content from the candidate documents in the new document. The content element recommendation module 110 displays the candidate documents in a new user interface (e.g., new pane) of the programmatic client 108. In another example, the content element recommendation module 110 uses the identified content to identify content from candidate documents. The content element recommendation module 110 displays the suggested content in the new user interface (e.g., new pane) of the programmatic client 108. In one example, the content element recommendation module 110 analyzes charts/graphs/images that the user 132 just edited.

In another example embodiment, the content element recommendation module 110 triggers a pane pop-up that includes the candidate documents in response to the user's request to find documents with content relevant to the document currently present in the programmatic client 108. In another example embodiment, the content element recommendation module 110 learns from the user's behaviors (with respect to the programmatic client 108) and determines whether to trigger the pane pop-up at the programmatic client 108. For example, the content element recommendation module 110 automatically triggers the pane pop-up only on certain keywords, key trigger (e.g., double bracket), or a long-detected pause.

The content element recommendation module 110 may operate with the web client 112 and/or the programmatic client 108. In another example embodiment, the content element recommendation module 110 is part of the programmatic client 108 or web client 112. For example, the content element recommendation module 110 may operate as an extension or add on to the web client 112.

An Application Program Interface (API) server 120 and a web server 122 provide respective programmatic and web interfaces to application servers 104. A specific application server 118 hosts a document authoring application 124 and a content element recommendation engine 128. Both document authoring application 124 and content element recommendation engine 128 include components, modules and/or applications.

The document authoring application 124 includes a content creation application (e.g., Microsoft PowerPoint™, Microsoft Word™) that enables the user 132 to form content such as a presentation document, or a text document. In another example, the document authoring application 124 also includes a collaborative application that enables peer enterprise users to collaborate on a shared document. For example, the client device 106 may access the document authoring application 124 to view and edit a document that is shared with other peer users. Other examples of document authoring application 124 includes enterprise systems, content management systems, and knowledge management systems. The document authoring application 124 communicates with the programmatic client 108 on the client device 106. For example, the programmatic client 108 checks in with the document authoring application 124 and verifies a validity of a license or version of the programmatic client 108 on the client device 106. In another example embodiment, the programmatic client 108 includes at least one of a content creation application, a collaborative application, and a shared storage application.

In one example embodiment, the content element recommendation engine 128 communicates with the document authoring application 124 (or the content element recommendation module 110) to identify candidate documents based on a machine learning model that uses the content provided by the user 132 in the programmatic client 108 (or in the web client 112, or document authoring application 124) and other signals such as copy and paste activities of the programmatic client 108, profile of the user 132, attributes of the document currently edited in the programmatic client 108, features of documents in a library of documents previously authored, shared, edited by the user 132, or share with the user 132). The content element recommendation engine 128 communicates with the content element recommendation module 110 supported by the web server 122 to provide the candidate documents to the programmatic client 108. In another example, the content element recommendation module 110 includes functionalities of the content element recommendation engine 128. In another example, the content element recommendation module 110 includes components of the content element recommendation engine 128.

In one example embodiment, the web client 112 communicates with the content element recommendation engine 128 and document authoring application 124 via the programmatic interface provided by the Application Program Interface (API) server 120. In another example embodiment, the content element recommendation engine 128 sends the candidate documents to the content element recommendation module 110. The content element recommendation module 110 causes a display of the candidate documents in a pane pop-up based on current activities of the user 132 at the client device 106, current activities (or events) of the programmatic client 108, and a user profile of the user 132.

In one example embodiment, the content element recommendation engine 128 trains a machine learning model based on application events (activities of the user 132 on the client device 106 or the document authoring application 124) and features of documents from the library of documents. The content element recommendation engine 128 uses the machine learning model to determine whether a document from the library of documents is relevant and includes content that is likely to be reused by the user 132. The content element recommendation engine 128 identifies a set of candidate documents and causes the content element recommendation module 110 (or the programmatic client 108 or the web client 112) to display a pane pop-up at the programmatic client 108 or the web client 112.

The application server 118 is shown to be communicatively coupled to database servers 126 that facilitates access to an information storage repository or databases 130. In an example embodiment, the databases 130 includes storage devices that store information to be published and/or processed by the document authoring application 124. For example, the databases 130 include a library of documents (e.g., documents that are shared with the user 132, shared by the user 132, accessed, authored, or edited by the user 132 using the web client 112 or the programmatic client 108).

Additionally, a third-party application 116 executing on a third-party server 114, is shown as having programmatic access to the application server 118 via the programmatic interface provided by the Application Program Interface (API) server 120. For example, the third-party application 116, using information retrieved from the application server 118, may supports one or more features or functions on a website hosted by the third party. For example, the third-party application 116 identifies activities of the user 132 on the programmatic client 108. The third-party application 116 provides the activities to the content element recommendation engine 128. The content element recommendation engine 128 identifies candidate documents pertinent to the user 132 based on the activities of the user 132.

Figure 2:
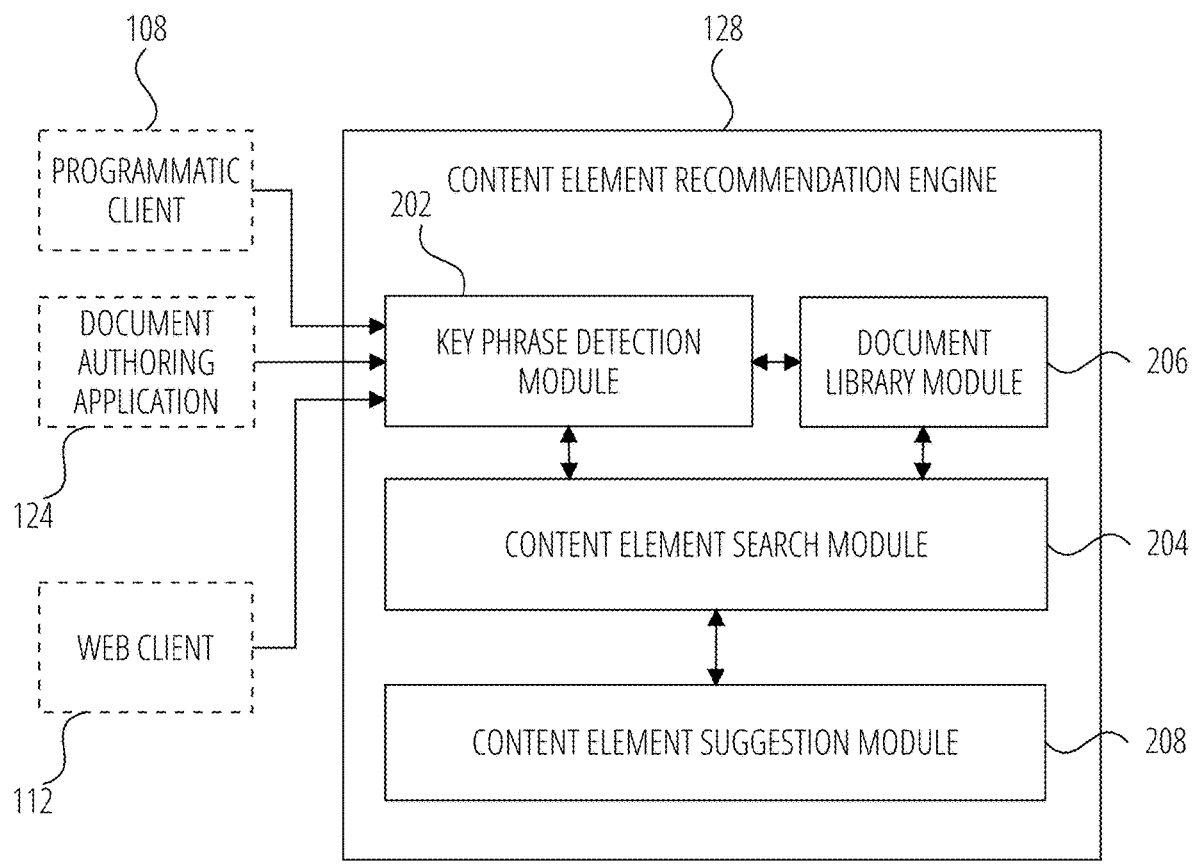
FIG. 2 is a block diagram illustrating a content element recommendation engine in accordance with one example embodiment.

FIG. 2 is a block diagram illustrating a content element recommendation engine 128 in accordance with one example embodiment. The key phrase detection module 202 accesses user activities data from at least one of the programmatic client 108, the document authoring application 124, and the web client 112.

In example, the key phrase detection module 202 identifies the last several words/phrases written by the user 132 of the document authoring application 124. For example, the key phrase detection module 202 detects the last words of a sentence typed by the user 132. In one example, the key phrase detection module 202 uses machine learning to identify relevant keywords or key terms.

In another example, the key phrase detection module 202 combines user activities data from a combination of the programmatic client 108, the document authoring application 124, and the web client 112. In one example embodiment, the user activities data include user application activities within the programmatic client 108, the document authoring application 124, and the web client 112. For example, the user activities data include copy and paste activities (e.g., which previous document was used to copy in a present document, which part of the previous document was copied), file activities (e.g., which files were last opened by the user 132, which files were recently updated from a group folder shared with the user 132), the type of content (e.g., a PowerPoint slide) being created by the user 132, which features of the document authoring application 124, programmatic client 108, and web client 112 are being used by the user 132, and other user activities related to the document authoring application 124, the programmatic client 108, and the web client 112. The key phrase detection module 202 provides the user activities data to the content element search module 204.

In another example, the key phrase detection module 202 identifies a user profile of the user 132 (e.g., user 132 is a new employee, is part of the accounting department group, and has used the programmatic client 108 less than five times). The key phrase detection module 202 provides the user profile to the content element search module 204.

The document library module 206 accesses a library of documents (that can be accessed with the programmatic client 108) stored in the databases 130. In one example, the library of documents includes different types of documents (e.g., Word documents or PowerPoint documents). The library of documents includes documents shared by the user 132 and documents shared with the user 132. In another example, the library includes documents that the user 132 has or has not previously viewed, edited, or authored. In another example, the library of documents includes documents created by any employee of an enterprise associated with the user 132. In another example, the library of documents includes any documents publicly or privately accessible by the user 132. The document library module 206 accesses the documents and the corresponding attributes (e.g., metadata) of the documents from the library of documents in databases 130, from another storage server, or from another computing device. The document library module 206 provides the documents and corresponding attributes to the content element search module 204.

The content element search module 204 operates using pattern detection algorithms and trained Machine Learning (ML) models to identify relevant documents (e.g., documents that the user 132 is likely to include—copy and paste content). For example, the content element search module 204 trains a machine learning model based on the signals from the key phrase detection module 202 and the document library module 206 to determine whether a document is likely to be pertinent/relevant to the user 132. In one example embodiments, the content element search module 204 analyzes events in the document authoring application 124 or programmatic client 108 to identify trends (e.g., a user has frequently chosen a particular document in the past). The content element search module 204 accesses the above signals from key phrase detection module 202 and the document library module 206. Using the information from the signals, the content element search module 204 can identify trends. Based on the machine learning model, the content element search module 204 can, in one embodiment, suggest candidate documents.

The content element search module 204 provides the set of candidate documents to the content element suggestion module 208. The content element suggestion module 208 generates a display of the set of candidate documents in a user interface (e.g., a pane) of the programmatic client 108. In another example, the content element suggestion module 208 identifies content (that the user 132 is likely to copy and paste) from the set of candidate documents in the user interface.

In another example embodiment, the key phrase detection module 202 detects a request to identify relevant documents from the programmatic client 108. In response to the request, the content element search module 204 identifies the set of candidate documents that are provided to the content element suggestion module 208.

Figure 3:
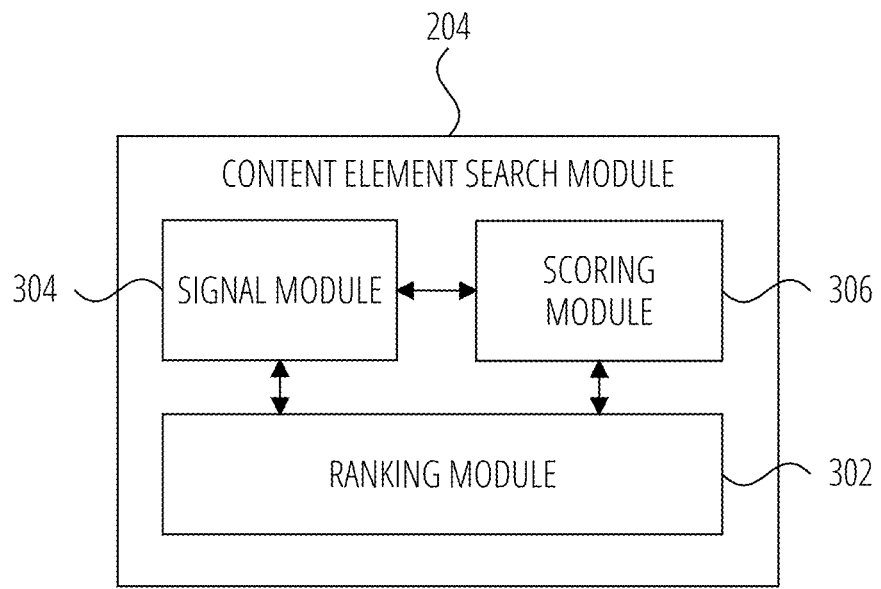
FIG. 3 is a block diagram illustrating a content element search module in accordance with one example embodiment.

FIG. 3 is a block diagram illustrating a content element search module 204 in accordance with one example embodiment. The content element search module 204 includes a signal module 304, a scoring module 306, and a ranking module 302.

In one example embodiment, the signal module 304 accesses signals from the document authoring application 124. Example of signals include, but are not limited to: user activities history, document context, format of the document, expertise or profile of the user, project identification, key words, key phrases in the document. The signals may be obtained as the user 132 types.

The scoring module 306 computes a relevance score for each document based on a trained machine learning model. The relevance score indicates a likelihood that the user 132 will re-use a content from a library of documents into a document present in the programmatic client 108. In one example embodiment, the signal module 304 trains the machine learning model based on a document selected by the user 132 from a list of candidate documents.

The machine learning model of the signal module 304 is trained by data from key phrase detection module 202 and document library module 206. For example, the data includes labeled data (e.g., for each document, did the user select it?), input features for each document at the time it was shown to the user 132 (e.g., examples of input features are listed below), document groups (e.g., during a search, the user 132 is shown a list of documents, from which the user 132 selected one (or more); documents above the clicked document form the group; a ranking model is trained by adjusting the ranking until selected documents appear higher than non-selected docs in a test or cross-validation set).

The scoring module 306 uses a machine learning algorithm to train a machine learning model and compute the relevance score. The scoring module 306 uses, for example, the following feature inputs to the algorithm: for the document, keywords, key phrases, the filename, title, and the 200-character neighborhood around an insertion point. For each candidate document, the filename, title, and summary are used as the input 'content'.

Once the scoring module 306 computes the relevance score for each candidate document (e.g., top 5 documents), the ranking module 302 ranks the candidate documents by relevance score. In one example, the ranking module 302 identifies a set of candidate documents with top relevance scores (e.g., top 5 documents).

The ranking module 302 ranks the candidate documents from the library of documents based on their corresponding relevance score and identifies a top predefined number of documents (e.g., top 5 documents for each type of document, top 5 most relevant sections/content).

Figure 4:
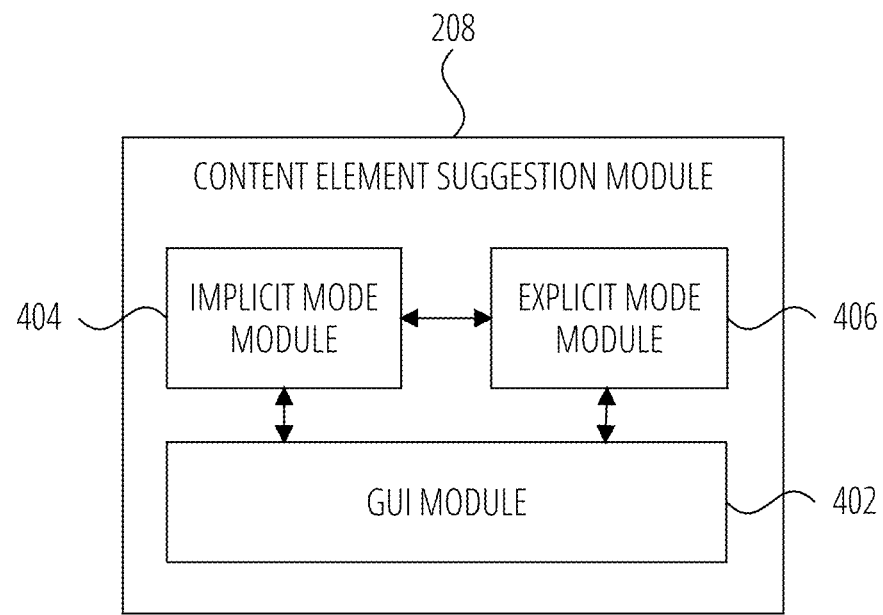
FIG. 4 is a block diagram illustrating a content element suggestion module in accordance with one example embodiment.

FIG. 4 is a block diagram illustrating a content element suggestion module 208 in accordance with one example embodiment. The content element suggestion module 208 includes an implicit mode module 404, an explicit mode module 406, and a GUI module 402.

The implicit mode module 404 surfaces suggestions, where, depending on the current context and what the user 132 is doing. The suggestion identifies and suggests content that might be helpful to the user 132.

For example, as the user 132 is typing in the document authoring application 124, a subtle lightbulb appears on the right side of the GUI. The user 132 can click on the lightbulb, at which point, the implicit mode module 404 underlines the key phrases in the document, while showing a set of related links or knowledge that relates to what the user 132 is working on. The user can choose to pull those links directly into the content he/she is creating, at which point, it appears inline.

Other alternative embodiments include:
determining a high confidence of a suggested document and displaying the suggested document in a margin of the document.
generating a configurable "card" experience-based on the suggested document/content;
the card may display a hyperlink to the suggested document with a preview of the specific content when the user hovers his/her pointer over the hyperlink.
exposing supplemental information such as related people, other dynamic components (e.g., also referred to as fluid documents), sub-pieces of documents (e.g., slides or charts), knowledge topics from search, or any number of other entities.
leveraging contextual signals to improve for relevant documents/content: examples of contextual clues include identifying what project a document is associated with, identifying other users working on the same document, headings or metadata in the document.

In one example embodiment, the content element recommendation engine 128 actively monitors the content the user 132 is typing in a dynamic document canvas. The content element recommendation engine 128 sends detected text to an application service (e.g., Azure Cognitive Services text analytics) using corresponding APIs, where the application service identifies key words or phrases in the text the user 132 is typing. The content element recommendation engine 128 then forwards a set of phrases to a search service that returns a set of results.

In the implicit mode, the implicit mode module 404 surfaces suggestions as the user 132 types.

In the explicit mode, the explicit mode module 406 waits for the user 132 to explicitly express an intent to trigger a search, then to display suggestions. For example, the explicit mode module 406 detects that a user types two consecutive bracket character. The explicit mode module 406 uses that as a trigger to bring up a related knowledge picking experience. As the user 132 types more characters after the brackets, the results in the picking experience are refined. If one of the results is picked, the explicit mode module 406 displays a link to the content that was added.

The following illustrates further alternative embodiments:
improving the relevance of the default set of suggestions based on the context and what can be inferred about user intent.
communicating with external services (outside the document authoring application 124) in the suggestions.
underlining parts of the document (being edited) that generate higher-confidence AI-driven suggestions for related content, without needing to activate a GUI element (e.g., lightbulb) or other indicator (e.g., "yellow squiggles") in the margin of the document.
differentiating between collaborators behaving as "authors" (someone actively editing a portion of the document) and "viewers," and either only showing intelligence knowledge recommendations to those in the author context, or fading them away after a certain amount of time/"distance" from the authorship activity.
exposing document and other intelligent suggestions through a "+" Component addition menu (e.g., GUI element used to add a table, list, paragraph or other "core" (but blank) document elements).
exposing these suggestions in contextual menus for already-authored content (e.g., alongside the entry point for adding a link).
exposing not only existing documents as suggestions, but the suggestion to create a document when that intent is observed (e.g., "create a PowerPoint" is linked by the AI to trigger creation of a new .pptx in an appropriate location).

Figure 5:
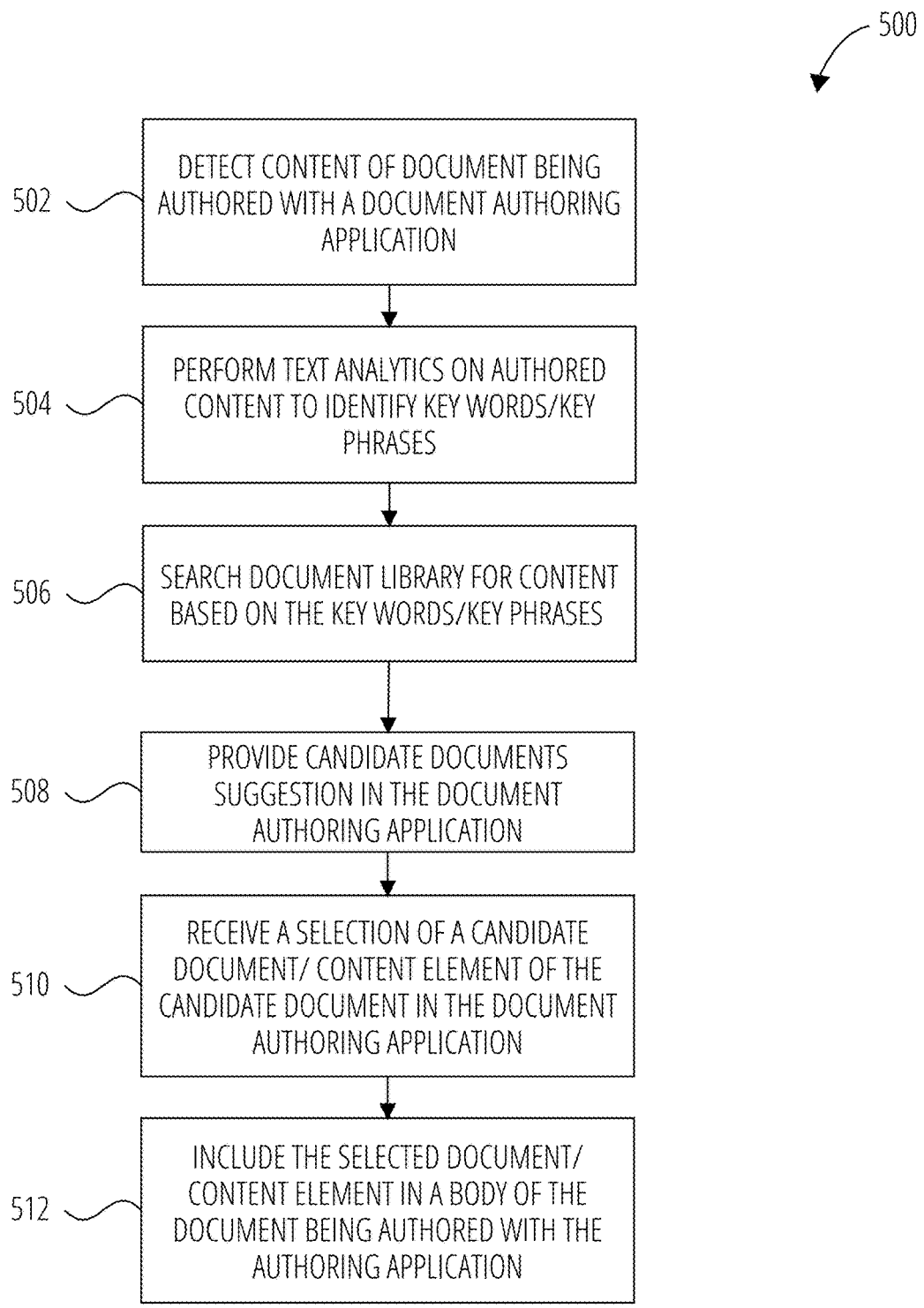
FIG. 5 is a flow diagram illustrating a method for suggesting content in accordance with one example embodiment.

FIG. 5 is a flow diagram illustrating a method for suggesting content in accordance with one example embodiment. Operations in the method 500 may be performed by the content element recommendation engine 128, using components (e.g., modules, engines) described above with respect to FIG. 2. Accordingly, the method 500 is described by way of example with reference to the content element recommendation engine 128. However, it shall be appreciated that at least some of the operations of the method 500 may be deployed on various other hardware configurations or be performed by similar components residing elsewhere. For example, some of the operations may be performed at the content element recommendation module 110.

In block 502, the content element recommendation engine 128 detects content of document being authored with a document authoring application. In block 504, the content element recommendation engine 128 performs text analytics on authored content to identify key words/key phrases. In block 506, the content element recommendation engine 128 searches document library for content (e.g., using document library module 206) based on the key words/key phrases. In block 508, the content element recommendation engine 128 provides candidate documents suggestion in the document authoring application. In block 510, the content element recommendation engine 128 receives a selection of a candidate document/content element of the candidate document in the document authoring application 124. In block 512, the content element recommendation engine 128 includes the selected document/content element in a body of the document being authored with the document authoring application 124.

Figure 6:
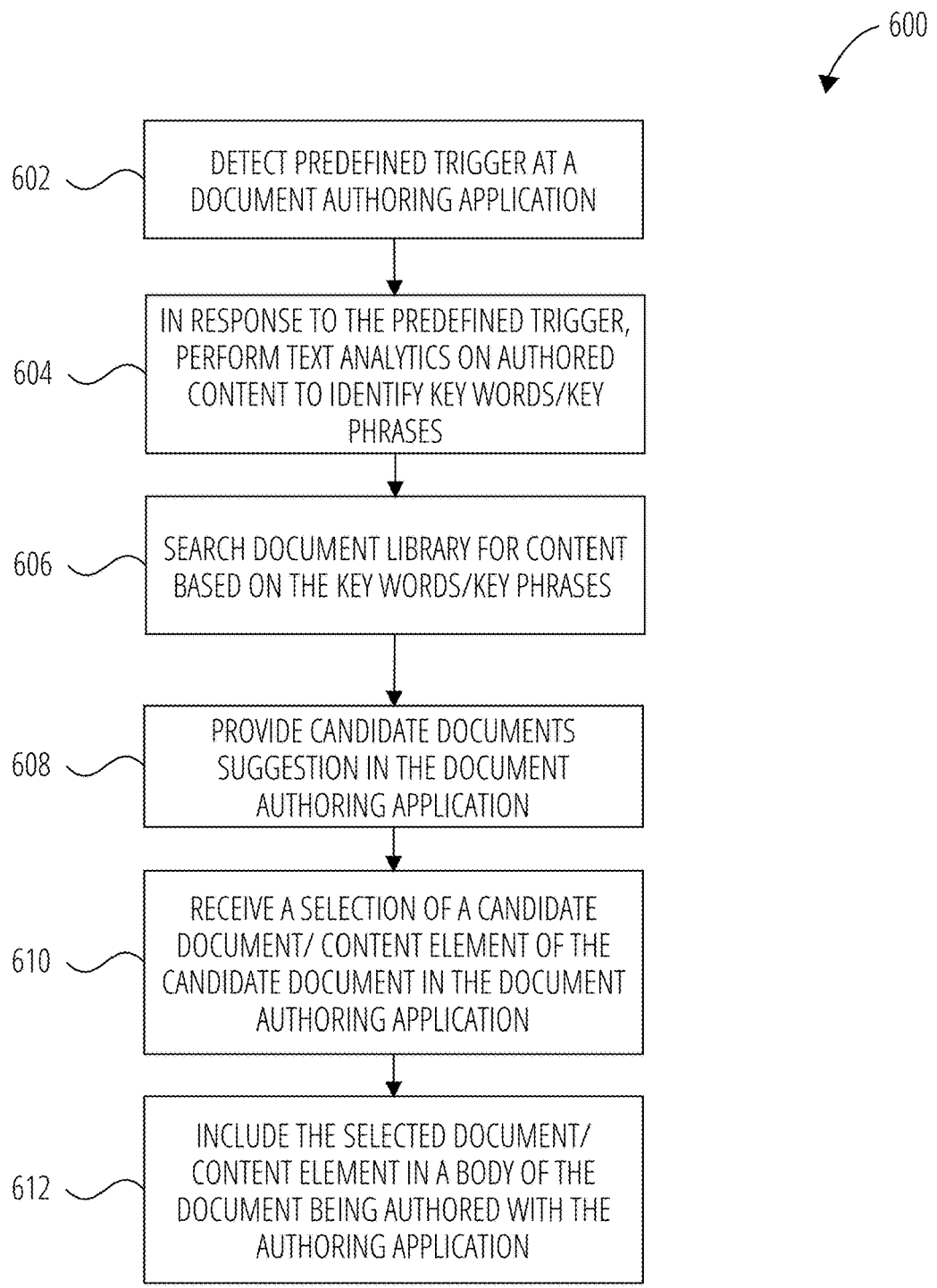
FIG. 6 is a flow diagram illustrating a method for suggesting content in accordance with one example embodiment.

FIG. 6 is a flow diagram illustrating a method 600 for suggesting content in accordance with one example embodiment. Operations in the method 600 may be performed by the content element recommendation engine 128, using components (e.g., modules, engines) described above with respect to FIG. 2. Accordingly, the method 600 is described by way of example with reference to the content element recommendation engine 128. However, it shall be appreciated that at least some of the operations of the method 600 may be deployed on various other hardware configurations or be performed by similar components residing elsewhere. For example, some of the operations may be performed at the content element recommendation module 110.

In block 602, the key phrase detection module 202 detects predefined trigger at the document authoring application 124. In block 604, in response to the predefined trigger, the key phrase detection module 202 performs text analytics on authored content to identify key words/key phrases. In block 606, the content element search module 204 searches document library (e.g., using document library module 206) for content based on the key words/key phrases. In block 608, the content element suggestion module 208 provides candidate documents suggestion in the document authoring application. In block 610, the content element suggestion module 208 receives a selection of a candidate document/content element of the candidate document in the document authoring application 124. In block 612, the content element suggestion module 208 includes the selected document/content element in a body of the document being authored with the document authoring application 124.

Figure 7:
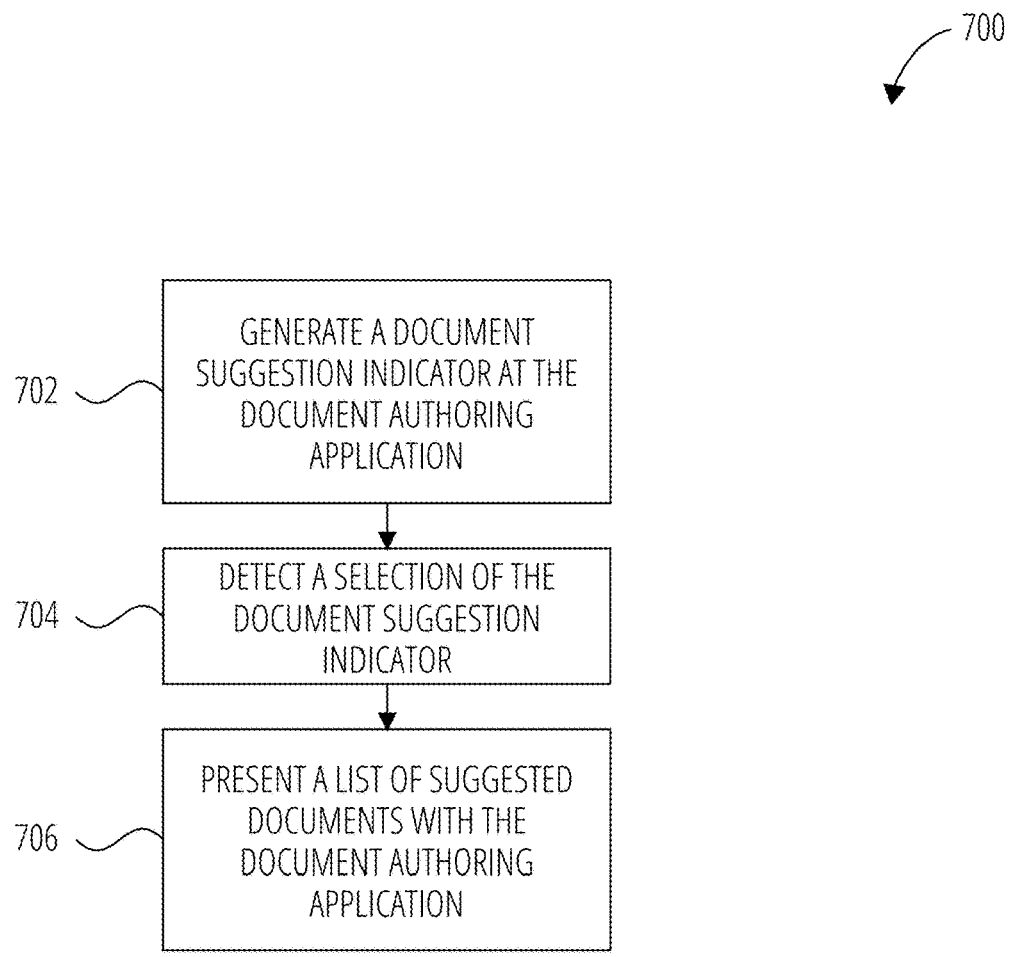
FIG. 7 is a flow diagram illustrating a method for generating a document suggestion indicator in accordance with one example embodiment.

FIG. 7 is a flow diagram illustrating a method 700 for generating a document suggestion indicator in accordance with one example embodiment. Operations in the method 700 may be performed by the content element recommendation engine 128, using components (e.g., modules, engines) described above with respect to FIG. 2. Accordingly, the method 700 is described by way of example with reference to the content element recommendation engine 128. However, it shall be appreciated that at least some of the operations of the method 700 may be deployed on various other hardware configurations or be performed by similar components residing elsewhere. For example, some of the operations may be performed at the content element recommendation module 110.

In block 702, the content element suggestion module 208 generates a document suggestion indicator at the document authoring application 124. In block 704, the content element suggestion module 208 detects a selection of the document suggestion indicator. In block 706, the content element suggestion module 208 presents a list of suggested documents with the document authoring application 124.

Figure 8:
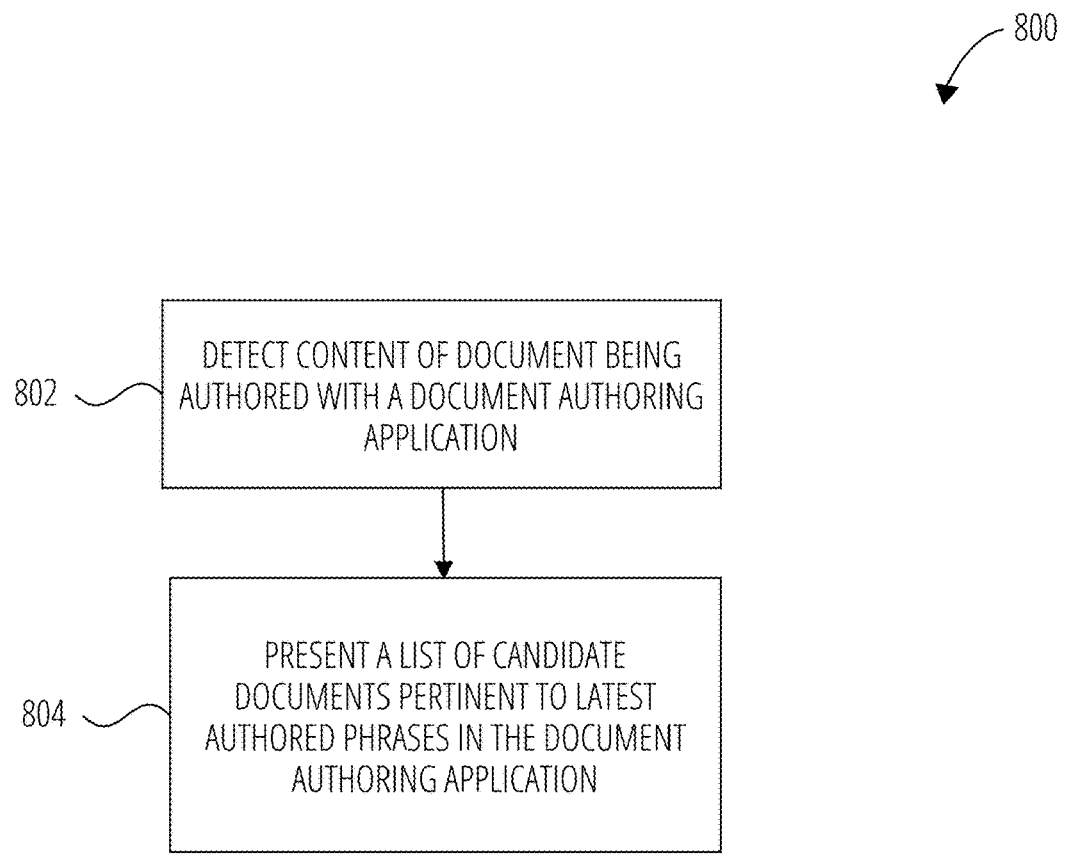
FIG. 8 is a flow diagram illustrating a method for presenting a list of candidate documents in accordance with one example embodiment.

FIG. 8 is a flow diagram illustrating a method 800 for presenting a list of candidate documents in accordance with one example embodiment. Operations in the method 800 may be performed by the content element recommendation engine 128, using components (e.g., modules, engines) described above with respect to FIG. 2. Accordingly, the method 800 is described by way of example with reference to the content element recommendation engine 128. However, it shall be appreciated that at least some of the operations of the method 800 may be deployed on various other hardware configurations or be performed by similar components residing elsewhere. For example, some of the operations may be performed at the content element recommendation module 110.

In block 802, the content element recommendation engine 128 detects content of document being authored with the document authoring application 124. In block 804, the content element recommendation engine 128 presents a list of candidate documents pertinent to latest authored phrases in the document authoring application 124.

Figure 9:
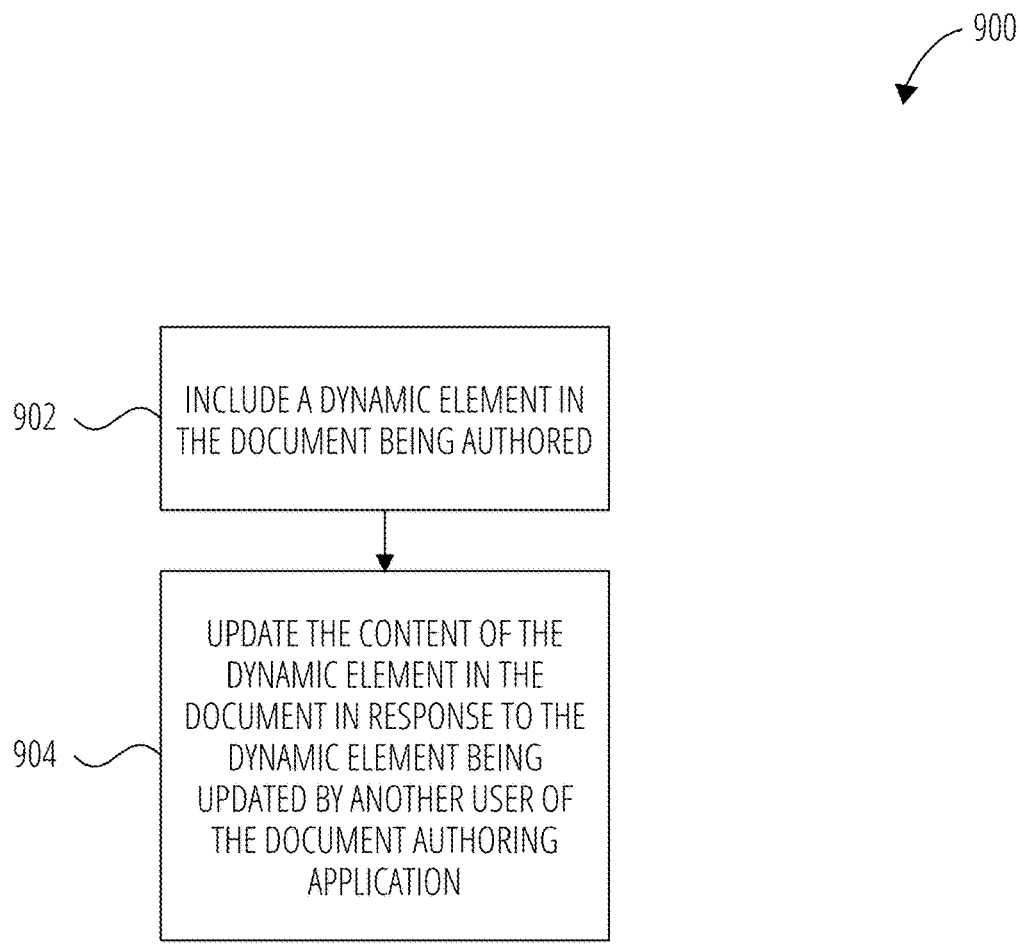
FIG. 9 is a flow diagram illustrating a method for updating content of a dynamic element in accordance with one example embodiment.

FIG. 9 is a flow diagram illustrating a method 900 for updating content of a dynamic element in accordance with one example embodiment. Operations in the method 900 may be performed by the content element recommendation engine 128, using components (e.g., modules, engines) described above with respect to FIG. 2. Accordingly, the method 900 is described by way of example with reference to the content element recommendation engine 128. However, it shall be appreciated that at least some of the operations of the method 900 may be deployed on various other hardware configurations or be performed by similar components residing elsewhere. For example, some of the operations may be performed at the content element recommendation module 110.

In block 902, the content element recommendation engine 128 includes a dynamic element in the document being authored. In block 904, the content element recommendation engine 128 updates the content of the dynamic element in the document in response to the dynamic element being updated by another user of the document authoring application 124.

Figure 10:
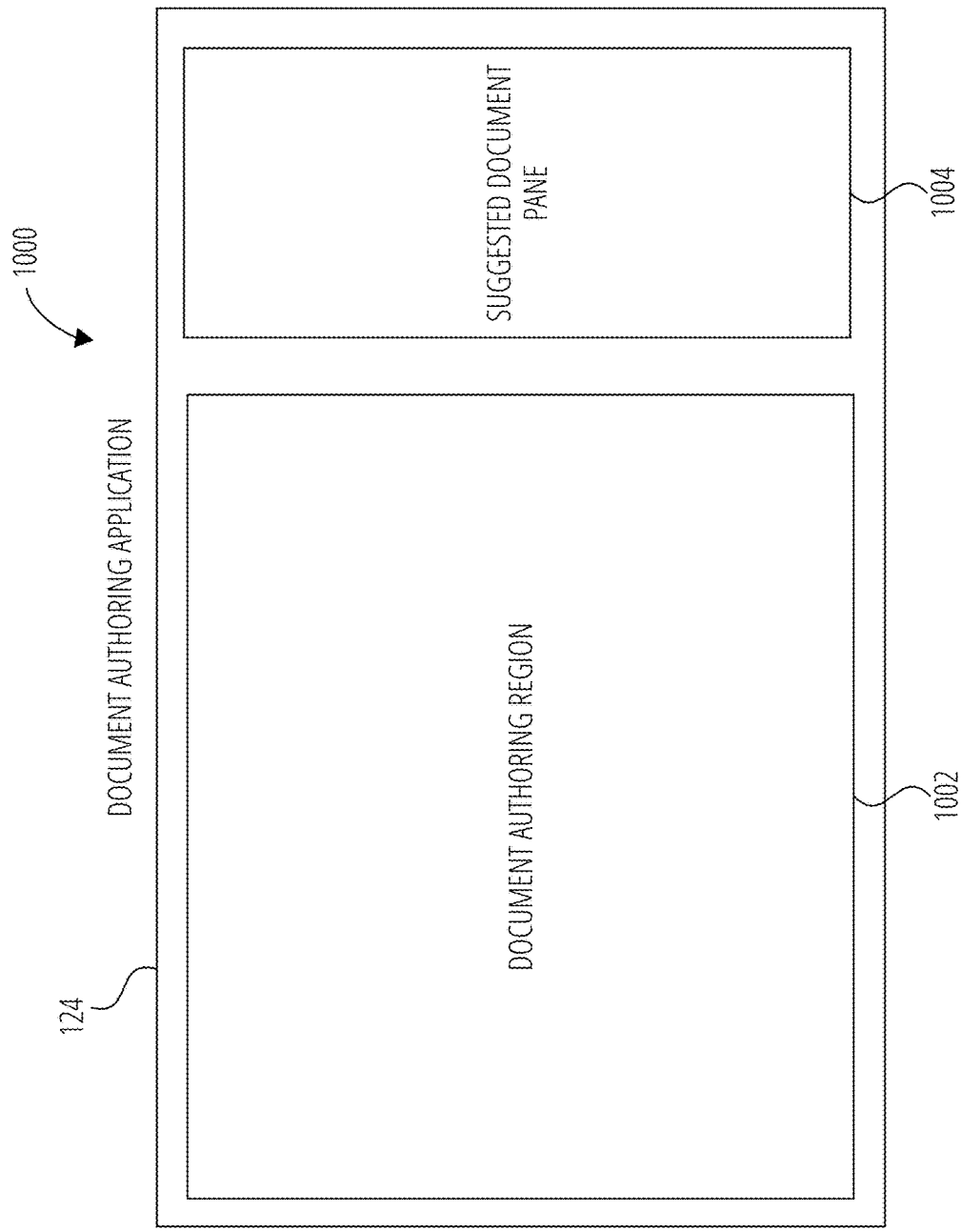
FIG. 10 illustrates an example of a graphical user interface in accordance with one example embodiment.

FIG. 10 illustrates an example of a graphical user interface 1000 in accordance with one example embodiment. The graphical user interface 1000 depicts the document authoring application 124, the document authoring region 1002, the pertinent document pane 1004. For example, the user 132 operates the document authoring application 124 by editing content in the document authoring region 1002. The content element suggestion module 208 causes a display of the pertinent document pane 1004 based on the content in the document authoring region 1002. The pertinent document pane 1004 includes a pop-up element that is triggered by the content in the document authoring region 1002. The user 132 can then select a suggested content displayed in the pertinent document pane 1004 and then close the pertinent document pane 1004.

Figure 11:
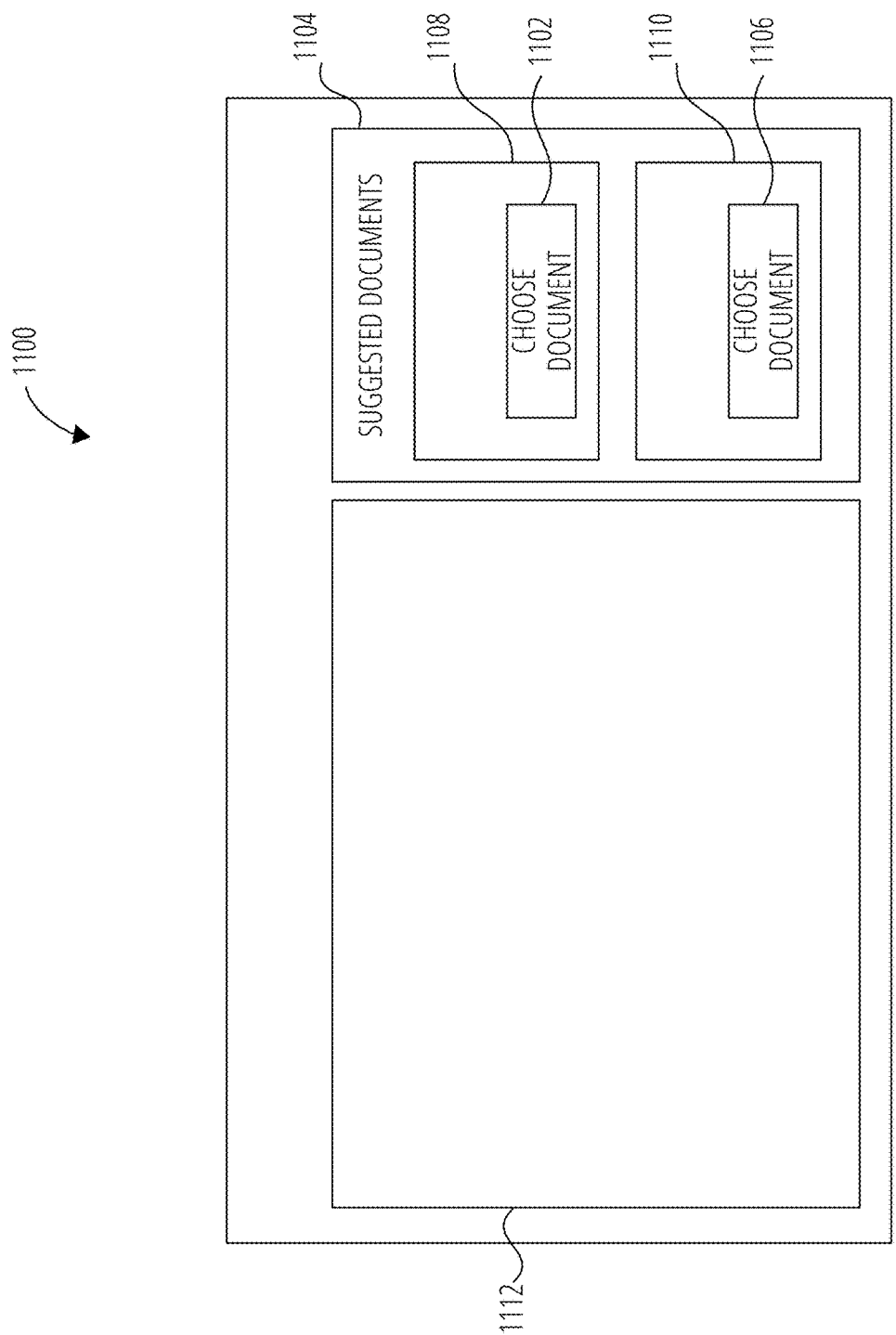
FIG. 11 illustrates an example of a graphical user interface in accordance with one example embodiment.

FIG. 11 illustrates an example of a graphical user interface 1100 in accordance with one example embodiment. The graphical user interface 1100 depicts a screenshot of a user interface of the document authoring application 124. The graphical user interface 1100 includes a document authoring region 1112 and suggested document pane 1104. The user 132 edits a current document in the document authoring region 1112. The suggested document pane 1104 shows top candidate documents (e.g., candidate document 1108, candidate document 1110) as provided by the ranking module 302. A graphical user interface control element (e.g., 1102, 1106) is presented for each candidate document. For example, when user 132 selects the button "CHOOSE DOCUMENT 1102", the candidate document 1108 is added to the document authoring region 1112.

Figure 12:
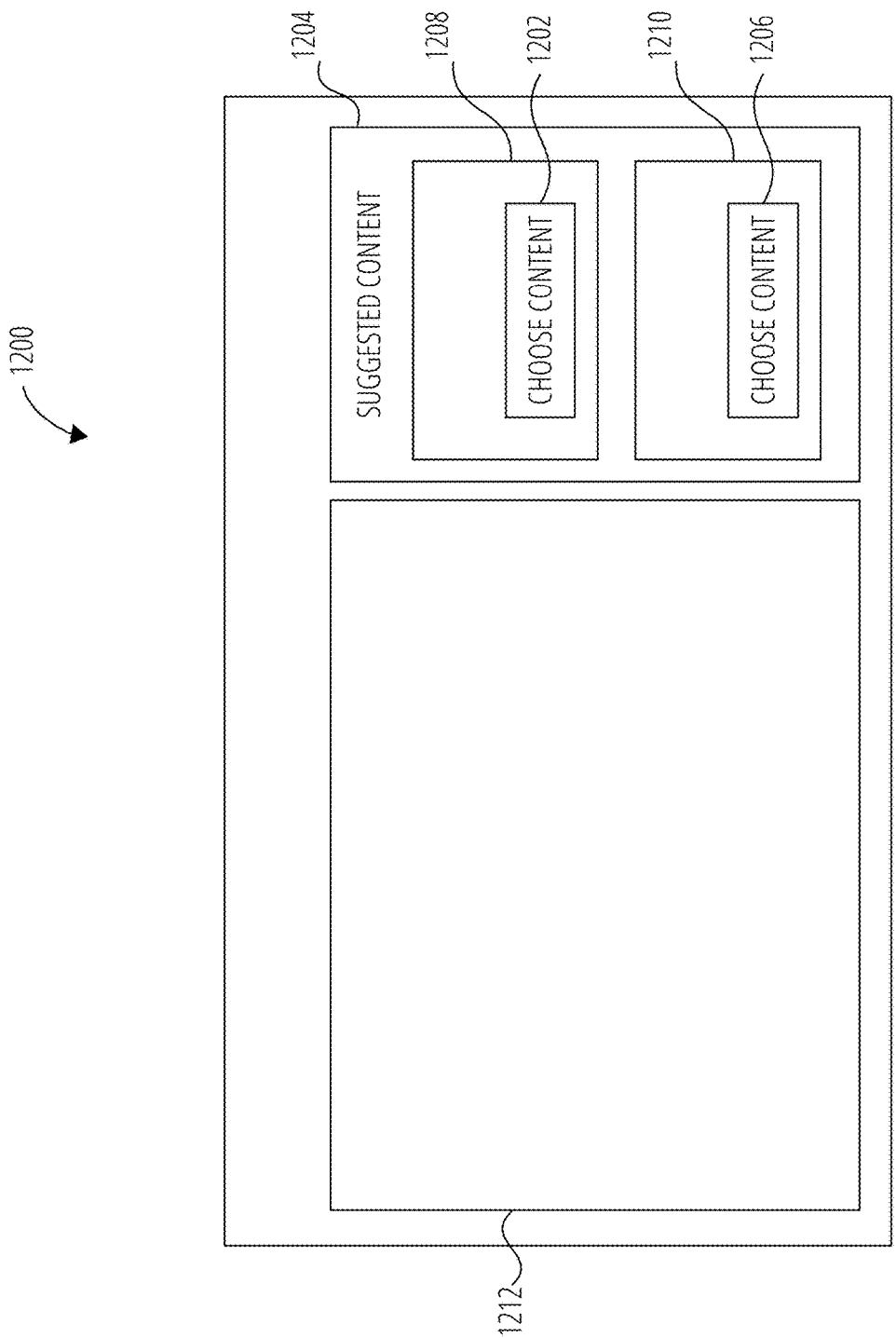
FIG. 12 illustrates an example of a graphical user interface in accordance with one example embodiment.

FIG. 12 illustrates an example of a graphical user interface 1200 in accordance with one example embodiment. The graphical user interface 1200 depicts a screenshot of a user interface of the document authoring application 124. The graphical user interface 1200 includes a document authoring region 1212 and suggested document pane 1204. The user 132 edits a current document in the document authoring region 1212. The suggested document pane 1204 shows top candidate content (e.g., candidate element 1208, candidate element 1210) as provided by the ranking module 302. A graphical user interface control element (e.g., 1202, 1206) is presented for each candidate element (e.g., dynamic content element). For example, when user 132 selects the button "CHOOSE CONTENT 1202", the candidate element 1208 is added to the document authoring region 1212.

Figure 13:
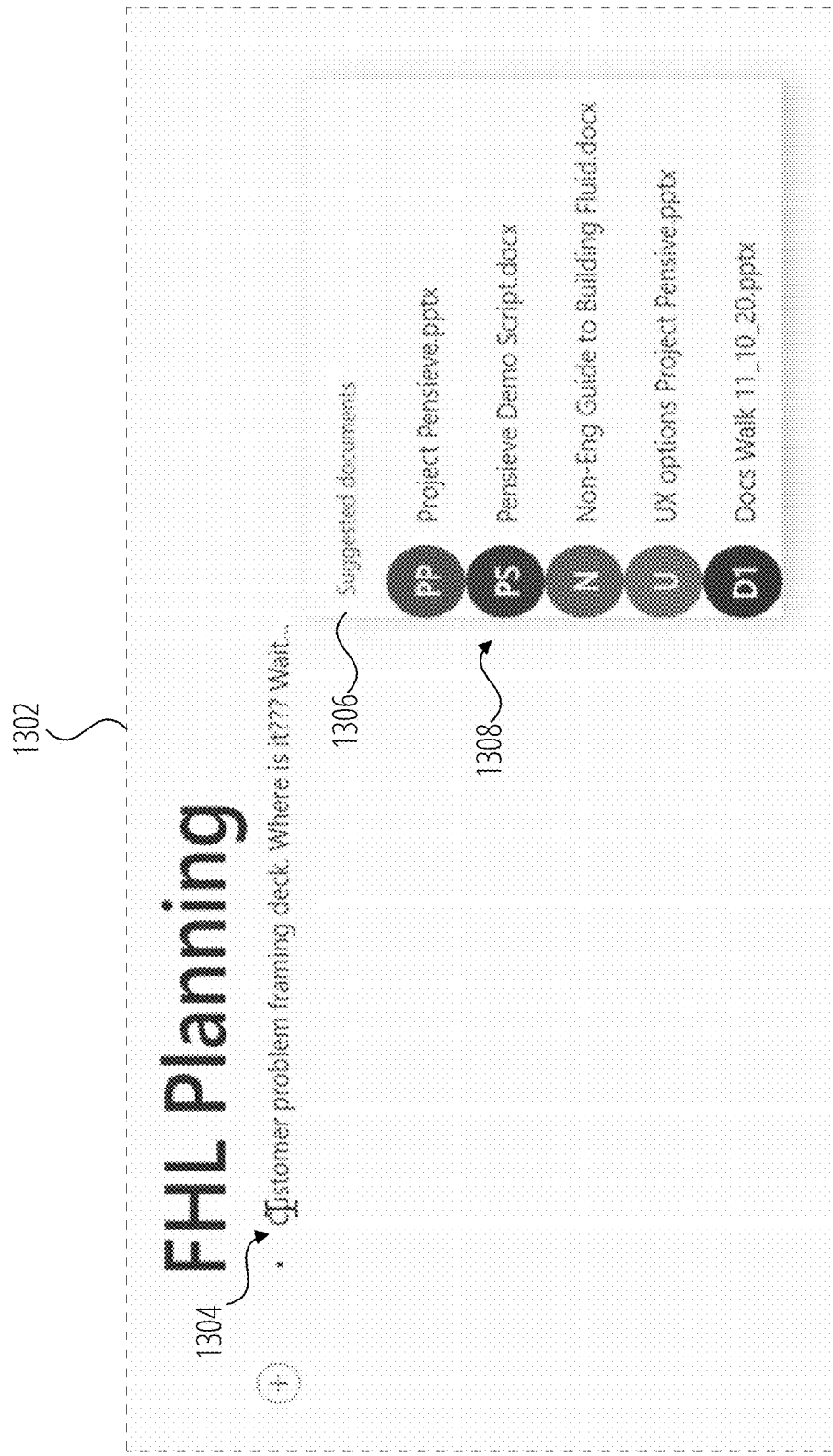
FIG. 13 illustrates a graphical user interface in accordance with one example embodiment.

FIG. 13 illustrates a graphical user interface 1302 in accordance with one example embodiment. User 132 enters a user entry 1304 using the document authoring application 124. The content element recommendation engine 128 analyzes the user entry 1304 and in response, generates a suggested documents box 1306 that includes a list of suggested documents 1308.

Figure 14:
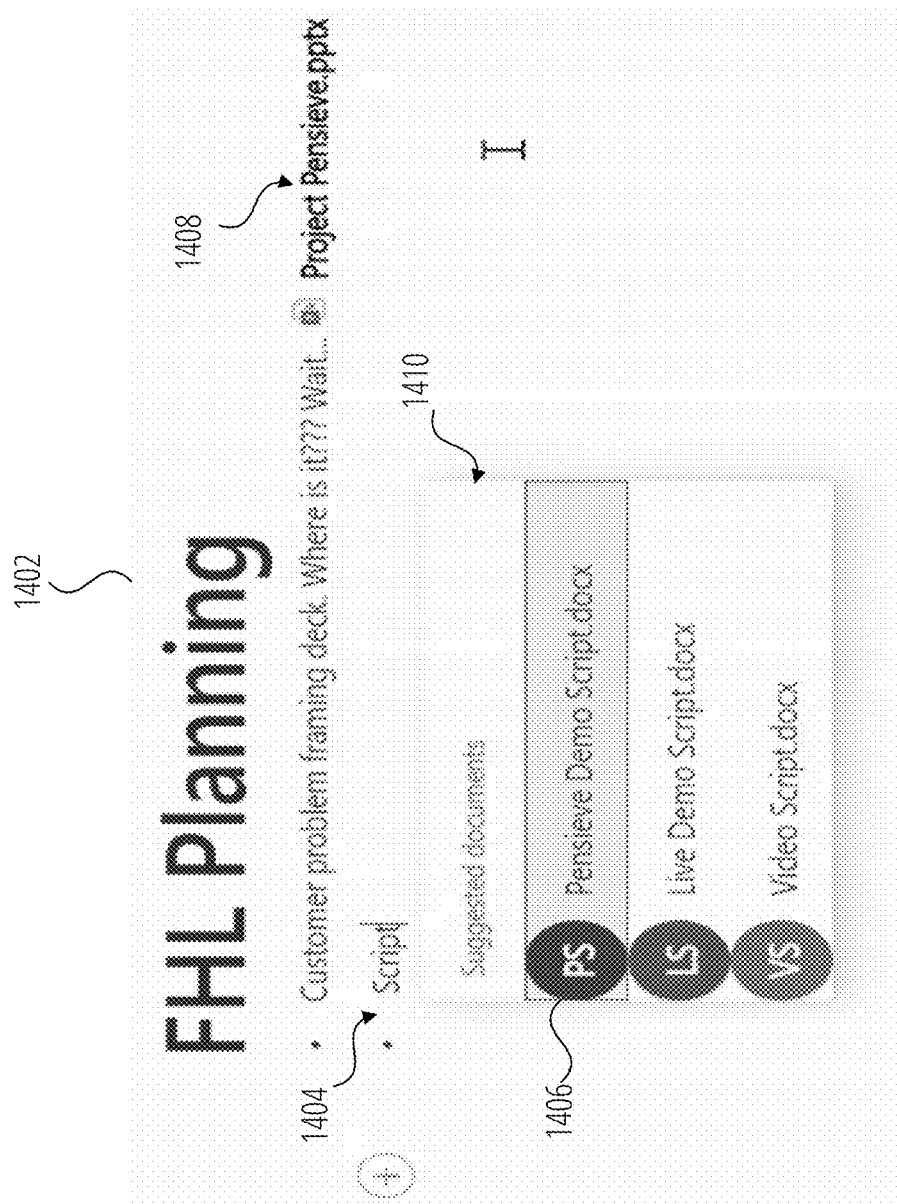
FIG. 14 illustrates a graphical user interface in accordance with one example embodiment.

FIG. 14 illustrates a graphical user interface 1402 in accordance with one example embodiment. User 132 enters a user entry 1404 using the document authoring application 124. The content element recommendation engine 128 analyzes the user entry 1404 and in response, generates a list of suggested documents 1410. The user 132 indicates the selected suggested document 1406. The content element recommendation engine 128 appends/includes the inserted selected suggested document 1408 in the body of the document being edited. For example, the content element recommendation engine 128 includes a hyperlink to a location where the selected suggested document 1406 is stored.

Figure 15:
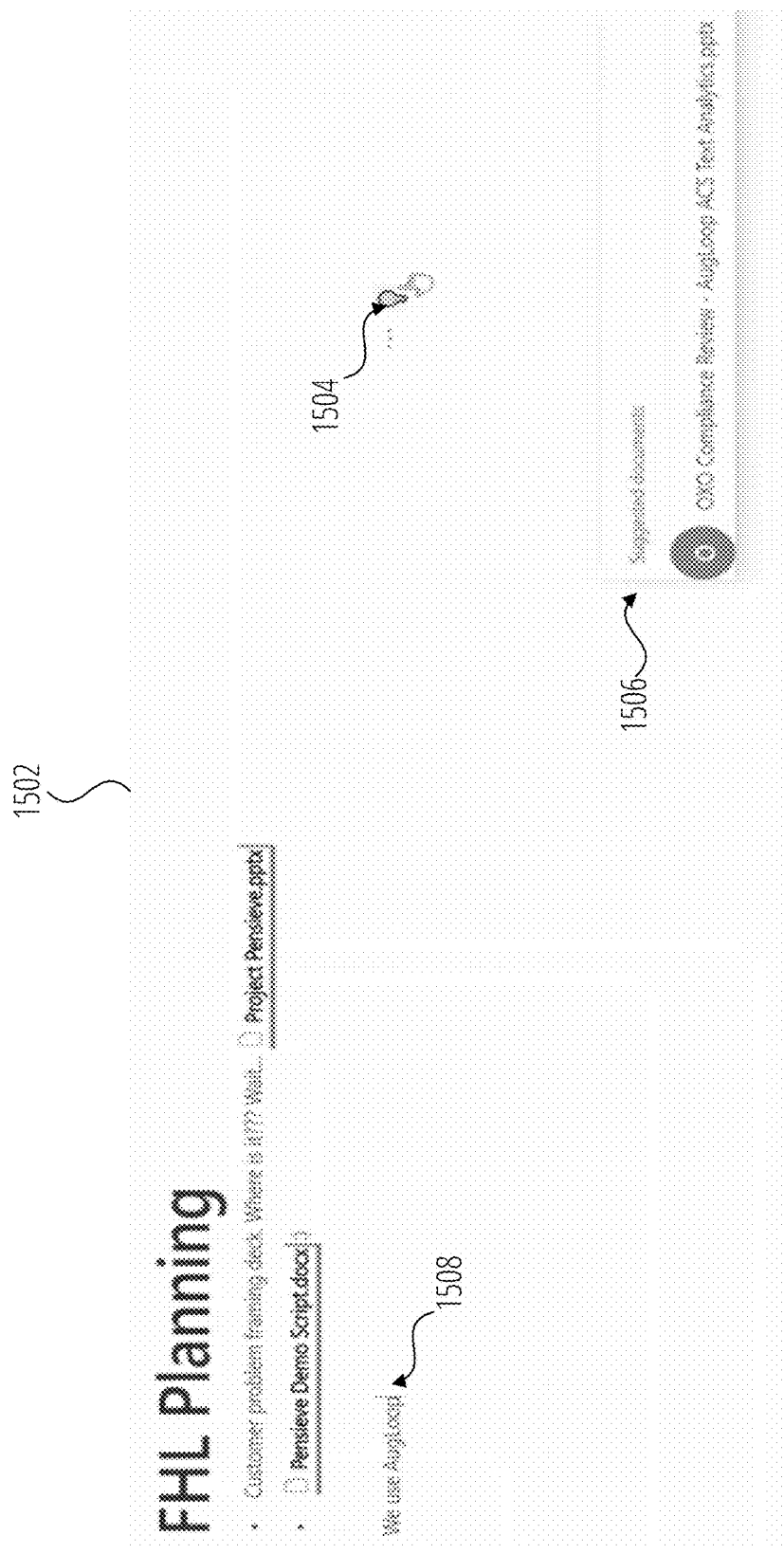
FIG. 15 illustrates a graphical user interface in accordance with one example embodiment.

FIG. 15 illustrates a graphical user interface 1502 in accordance with one example embodiment. The graphical user interface 1502 displays a suggested documents indicator 1504 (e.g., a lightbulb icon). The user 132 selects the suggested documents indicator 1504, and in response, the content element recommendation engine 128 generates a list of suggested documents 1506 (based on the user entry 1508).

Figure 16:
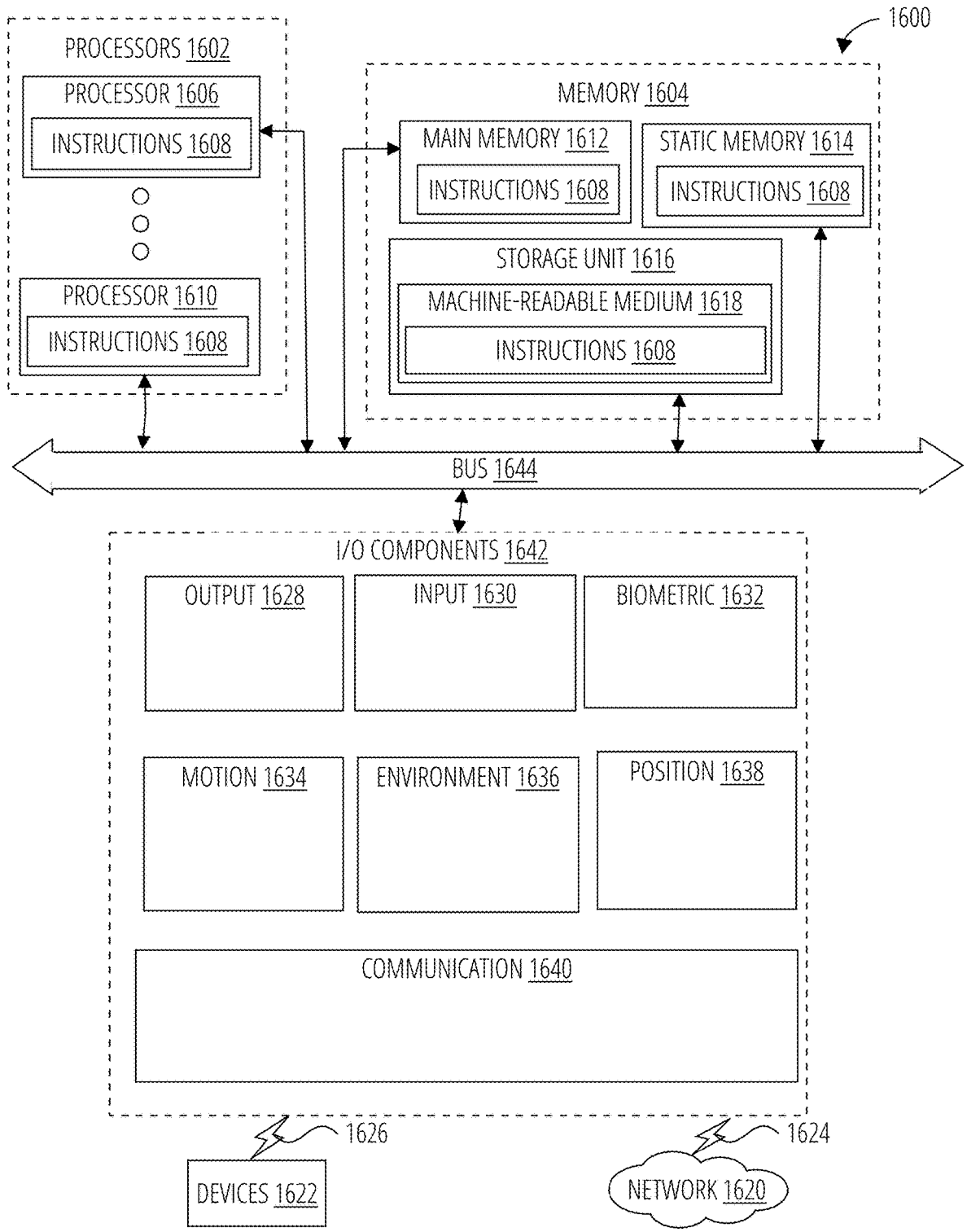
FIG. 16 is a diagrammatic representation of a machine in the form of a computer system within which a set of instructions may be executed for causing the machine to perform any one or more of the methodologies discussed herein, according to an example embodiment.

FIG. 16 is a diagrammatic representation of the machine 1600 within which instructions 1608 (e.g., software, a program, an application, an applet, an app, or other executable code) for causing the machine 1600 to perform any one or more of the methodologies discussed herein may be executed. For example, the instructions 1608 may cause the machine 1600 to execute any one or more of the methods described herein. The instructions 1608 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1608, sequentially or otherwise, that specify actions to be taken by the machine 1600. Further, while only a single machine 1600 is illustrated, the term "machine" shall also be taken to include a collection of machines that individually or jointly execute the instructions 1608 to perform any one or more of the methodologies discussed herein.

The machine 1600 may include processors 1602, memory 1604, and I/O components 1642, which may be configured to communicate with each other via a bus 1644. In an example embodiment, the processors 1602 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1606 and a processor 1610 that execute the instructions 1608. The term "processor" is intended to include multi-core processors that may comprise two or more independent processors (sometimes referred to as "cores") that may execute instructions contemporaneously. Although FIG. 16 shows multiple processors 1602, the machine 1600 may include a single processor with a single core, a single processor with multiple cores (e.g., a multi-core processor), multiple processors with a single core, multiple processors with multiples cores, or any combination thereof.

The memory 1604 includes a main memory 1612, a static memory 1614, and a storage unit 1616, both accessible to the processors 1602 via the bus 1644. The main memory 1604, the static memory 1614, and storage unit 1616 store the instructions 1608 embodying any one or more of the methodologies or functions described herein. The instructions 1608 may also reside, completely or partially, within the main memory 1612, within the static memory 1614, within machine-readable medium 1618 within the storage unit 1616, within at least one of the processors 1602 (e.g., within the processor's cache memory), or any suitable combination thereof, during execution thereof by the machine 1600.

The I/O components 1642 may include a wide variety of components to receive input, provide output, produce output, transmit information, exchange information, capture measurements, and so on. The specific I/O components 1642 that are included in a particular machine will depend on the type of machine. For example, portable machines such as mobile phones may include a touch input device or other such input mechanisms, while a headless server machine will likely not include such a touch input device. It will be appreciated that the I/O components 1642 may include many other components that are not shown in FIG. 16. In various example embodiments, the I/O components 1642 may include output components 1628 and input components 1630. The output components 1628 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1630 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1642 may include biometric components 1632, motion components 1634, environmental components 1636, or position components 1638, among a wide array of other components. For example, the biometric components 1632 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1634 include acceleration sensor components (e.g., accelerometer), gravitation sensor components, rotation sensor components (e.g., gyroscope), and so forth. The environmental components 1636 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1638 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1642 further include communication components 1640 operable to couple the machine 1600 to a network 1620 or devices 1622 via a coupling 1624 and a coupling 1626, respectively. For example, the communication components 1640 may include a network interface component or another suitable device to interface with the network 1620. In further examples, the communication components 1640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1622 may be another machine or any of a wide variety of peripheral devices (e.g., a peripheral device coupled via a USB).

Moreover, the communication components 1640 may detect identifiers or include components operable to detect identifiers. For example, the communication components 1640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1640, such as location via Internet Protocol (IP) geolocation, location via Wi-Fi® signal triangulation, location via detecting an NFC beacon signal that may indicate a particular location, and so forth.

The various memories (e.g., memory 1604, main memory 1612, static memory 1614, and/or memory of the processors 1602) and/or storage unit 1616 may store one or more sets of instructions and data structures (e.g., software) embodying or used by any one or more of the methodologies or functions described herein. These instructions (e.g., the instructions 1608), when executed by processors 1602, cause various operations to implement the disclosed embodiments.

The instructions 1608 may be transmitted or received over the network 1620, using a transmission medium, via a network interface device (e.g., a network interface component included in the communication components 1640) and using any one of a number of well-known transfer protocols (e.g., hypertext transfer protocol (HTTP)). Similarly, the instructions 1608 may be transmitted or received using a transmission medium via the coupling 1626 (e.g., a peer-to-peer coupling) to the devices 1622.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: performing an analysis of text of a document being authored by a user with a document authoring application; searching a document library for content elements and documents based on the analysis of the text; identifying candidate documents and candidate content based on the searching; presenting a list of candidate documents or candidate content with the document authoring application; receiving a selection of a candidate document or candidate content from the list in the document authoring application; and including an instance of the selected candidate document or candidate content in the document.

Example 2 includes example 1, further comprising: detecting a predefined trigger at the document authoring application, wherein the identifying candidate documents and candidate content is in response to detecting the predefined trigger.

Example 3 includes example 1, further comprising: generating a suggestion indicator in a graphical user interface generated by the document authoring application in response to identifying the candidate documents and candidate content based on the searching; detecting a selection of the suggestion indicator by the user of the document authoring application; and presenting a list of candidate documents or candidate content in response to detecting the selection.

Example 4 includes example 1, wherein performing the analysis of text of the document comprises: identifying the last predefined number of words or phrases authored in the document by the user; and analyzing the last predefined number of words or phrases as the document is being authored by the user.

Example 5 includes example 1, wherein the candidate content comprises a dynamic element that is updated near real-time based on changes to the dynamic element by other users having access to the dynamic element.

Example 6 includes example 1, further comprising: identifying a user profile of a user operating the document authoring application; and training a machine learning model based on the user profile and the pattern of events from the document authoring application.

Example 7 includes example 6, wherein the user profile of the user indicates an enterprise profile of the user, collaborators of the user, a group within an enterprise to which the user belongs, an operating system of the client device, and a time and day of the document authoring application activities of the user.

Example 8 includes example 1, further comprising: training a machine learning model based on the pattern of events from the document authoring application.

Example 9 includes example 8, wherein the pattern of events comprises: features of the document present in the document authoring application; features of the first candidate document selected by the user; and features of a second candidate document not selected by the user.

Example 10 includes example 1, further comprising: computing the relevance score for each candidate document in the document library based on the machine learning model, the relevance score for each candidate document being indicative of a relevance of each candidate document to the document present in the document authoring application.

Example 11 includes example 10, further comprising: ranking each candidate document based on their corresponding relevance score; and identifying top candidate documents from the ranked candidate documents, the set of candidate documents including the top candidate documents.

Example 12 includes example 1, further comprising: identifying relevant content from the set of candidate documents, the relevant content being pertinent to the content in the document present in the document authoring application, wherein providing the set of candidate documents in the user interface element of the document authoring application further comprises: identifying the relevant content from the set of candidate documents in the user interface element of the document authoring application.

Example 13 includes example 1, wherein the document library includes documents authored, read, edited, and shared by the user of the document authoring application, and documents shared to or from the user.

Example 14 includes example 1, wherein the relevance score is based on a current document feature inputs and candidate document feature inputs, the user document feature inputs comprising a filename, a title, and a preset character neighborhood around an insertion point in the document present in the document authoring application, and the candidate document feature inputs comprising a filename, a title, and a summary of a corresponding candidate document.

Example 15 includes example 1, further comprising: causing a display of a first user interface element of the document authoring application adjacent to a second user interface element of the document authoring application in response to receiving the request, the first user interface element comprising the document being formed by the document authoring application, the second user interface element comprising one or more candidate documents from the set of candidate documents.

Example 16 is a computing apparatus comprising: a processor; and a memory storing instructions that, when executed by the processor, configure the apparatus to: perform an analysis of text of a document being authored by a user with a document authoring application; search a document library for content elements and documents based on the analysis of the text; identify candidate documents and candidate content based on the searching; present a list of candidate documents or candidate content with the document authoring application; receive a selection of a candidate document or candidate content from the list in the document authoring application; and include an instance of the selected candidate document or candidate content in the document.

Example 17 includes example 16, wherein the instructions further configure the apparatus to: detect a predefined trigger at the document authoring application, wherein the identifying candidate documents and candidate content is in response to detecting the predefined trigger.

Example 18 includes example 16, wherein the instructions further configure the apparatus to: generate a suggestion indicator in a graphical user interface generated by the document authoring application in response to identifying the candidate documents and candidate content based on the searching; detect a selection of the suggestion indicator by the user of the document authoring application; and present a list of candidate documents or candidate content in response to detecting the selection.

Example 19 includes example 16, wherein performing the analysis of text of the document comprises: identify the last predefined number of words or phrases authored in the document by the user; and analyze the last predefined number of words or phrases as the document is being authored by the user.

Example 20 is a non-transitory computer-readable storage medium, the computer-readable storage medium including instructions that when executed by a computer, cause the computer to: perform an analysis of text of a document being authored by a user with a document authoring application; search a document library for content elements and documents based on the analysis of the text; identify candidate documents and candidate content based on the searching; present a list of candidate documents or candidate content with the document authoring application; receive a selection of a candidate document or candidate content from the list in the document authoring application; and include an instance of the selected candidate document or candidate content in the document.

What is claimed is:

1. A computer-implemented method comprising:
    monitoring content in a document a user is typing in a document authoring application of a client device;
    identifying a last predefined number of words or phrases authored in the document by the user typing in the document authoring application;
    performing an analysis of the last predefined number of words or phrases authored in the document by the user typing in the document authoring application;
    searching a document library for content elements and documents based on the analysis of the last predefined number of words or phrases authored in the document;
    identifying candidate documents and candidate content based on the searching;

identifying user's interactions with the document authoring application and determining whether to display, based on the user's interactions, a candidate graphical user interface that includes the candidate documents and the candidate content, the user's interactions comprising a combination of predefined keywords and predefined key triggers;
generating a suggestion indicator in a graphical user interface generated by the document authoring application in response to identifying the candidate documents and candidate content based on the searching;
detecting a selection of the suggestion indicator by the user of the document authoring application;
in response to detecting the selection of the suggestion indicator, visually identifying key phrases in the document in the document authoring application;
presenting a list of the candidate documents or candidate content in a pane of the graphical user interface;
receiving a selection of a candidate document or candidate content from the list in the document authoring application;
identifying a portion of the candidate document or candidate content, the portion being relevant to the last predefined number of words or phrases of the document; and
including the portion of the candidate document or candidate content in a body of the document.

2. The computer-implemented method of claim 1, further comprising:
detecting a predefined trigger at the document authoring application,
wherein the identifying candidate documents and candidate content is in response to detecting the predefined trigger.

3. The computer-implemented method of claim 1, wherein including the portion of the candidate document or candidate content further comprises:
identifying a location, in the body of the document, based on the last predefined number of words or phrases authored in the document by the user; and
adding the portion of the candidate document or candidate content at the location in the body of the document.

4. The computer-implemented method of claim 1, wherein the candidate content comprises a dynamic element that is updated near real-time based on changes to the dynamic element by other users having access to the dynamic element.

5. The computer-implemented method of claim 1, further comprising:
identifying a user profile of the user operating the document authoring application; and
training a machine learning model based on the user profile and a pattern of events from the document authoring application.

6. The computer-implemented method of claim 5, wherein the user profile of the user indicates an enterprise profile of the user, collaborators of the user, a group within an enterprise to which the user belongs, an operating system of the client device, and a time and day of document authoring application activities of the user.

7. The computer-implemented method of claim 1, further comprising:
training a machine learning model based on a pattern of events from the document authoring application.

8. The computer-implemented method of claim 7, wherein the pattern of events comprises:
features of the document present in the document authoring application;
features of a first candidate document selected by the user; and
features of a second candidate document not selected by the user.

9. The computer-implemented method of claim 7, further comprising:
computing a relevance score for each candidate document in the document library based on the machine learning model,
the relevance score for each candidate document being indicative of a relevance of each candidate document to the document present in the document authoring application.

10. The computer-implemented method of claim 9, further comprising:
ranking each candidate document based on their corresponding relevance score; and
identifying top candidate documents from the ranked candidate documents, a set of candidate documents including the top candidate documents.

11. The computer-implemented method of claim 9, wherein the relevance score is based on a current document feature inputs and candidate document feature inputs,
the current document feature inputs comprising a filename, a title, and a preset character neighborhood around an insertion point in the document present in the document authoring application, and
the candidate document feature inputs comprising a filename, a title, and a summary of a corresponding candidate document.

12. The computer-implemented method of claim 1, further comprising:
identifying relevant content from the candidate documents, the relevant content being pertinent to the content in the document present in the document authoring application,
wherein providing the candidate documents in the user interface element of the document authoring application further comprises: identifying the relevant content from a set of candidate documents in the user interface element of the document authoring application.

13. The computer-implemented method of claim 1, wherein the document library includes documents authored, read, edited, and shared by the user of the document authoring application, and documents shared to or from the user.

14. The computer-implemented method of claim 1, further comprising:
causing a display of a first user interface element of the document authoring application adjacent to a second user interface element of the document authoring application,
the first user interface element comprising the document being formed by the document authoring application,
the second user interface element comprising one or more candidate documents from a set of candidate documents.

15. A computing apparatus comprising:
a processor; and
a memory storing instructions that, when executed by the processor, configure the apparatus to:
monitor content of a document a user is typing in a document authoring application of a client device;
identify a last predefined number of words or phrases authored in the document by the user typing in the document authoring application;

perform an analysis of the last predefined number of words or phrases authored in the document by the user typing in the document authoring application;

search a document library for content elements and documents based on the analysis of the last predefined number of words or phrases authored in the document;

identify candidate documents and candidate content based on the searching;

identify a combination of predefined keywords typed by the user in the document authoring application, predefined key triggers typed by the user in the document authoring application, and long-detected pauses by the user in the document authoring application, and determine whether to display, based on the combination of predefined keywords and predefined key triggers, a candidate graphical user interface that includes the candidate documents and the candidate content;

generate a suggestion indicator in a graphical user interface generated by the document authoring application in response to identifying the candidate documents and candidate content based on the searching;

detect a selection of the suggestion indicator by the user of the document authoring application;

in response to detecting the selection of the suggestion indicator, visually identify key phrases in the document in the document authoring application;

present a list of the candidate documents or candidate content in a pane of the graphical user interface;

receive a selection of a candidate document or candidate content from the list in the document authoring application;

identify a portion of the candidate document or candidate content, the portion being relevant to the last predefined number of words or phrases of the document; and include the portion of the candidate document or candidate content in a body of the document.

16. The computing apparatus of claim 15, wherein the instructions further configure the apparatus to:

detect a predefined trigger at the document authoring application, wherein the identifying candidate documents and candidate content is in response to detecting the predefined trigger.

17. The computing apparatus of claim 15, wherein the instructions further configure the apparatus to:

identify a location, in the body of the document, based on the last predefined number of words or phrases authored in the document by the user; and add the portion of the candidate document or candidate content at the location in the body of the document.

18. The computing apparatus of claim 15, wherein performing the analysis of text of the document comprises:

identify the last predefined number of words or phrases authored in the document by the user; and analyze the last predefined number of words or phrases as the document is being authored by the user.

19. A non-transitory computer-readable storage medium, the computer-readable storage medium including instructions that when executed by a computer, cause the computer to:

monitor content of a document a user is typing in a document authoring application of a client device;

identify a last predefined number of words or phrases authored in the document by the user typing in the document authoring application;

perform an analysis of the last predefined number of words or phrases authored in the document by the user typing in the document authoring application;

search a document library for content elements and documents based on the analysis of the last predefined number of words or phrases authored in the document;

identify candidate documents and candidate content based on the searching;

identify, in an explicit mode, user's interactions with the document authoring application and determining whether to display, based on the user's interactions, a candidate graphical user interface that includes the candidate documents and the candidate content, the user's interactions comprising a combination of predefined keywords and predefined key triggers;

generate, in an implicit mode, a suggestion indicator in a graphical user interface generated by the document authoring application in response to identifying the candidate documents and candidate content based on the searching;

detect a selection of the suggestion indicator by the user of the document authoring application in the implicit mode;

in response to detecting the selection of the suggestion indicator, visually identify key phrases in the document in the document authoring application;

present a list of candidate documents or candidate content in a pane of the graphical user interface;

receive a selection of a candidate document or candidate content from the list in the document authoring application;

identify a portion of the candidate document or candidate content, the portion being relevant to the last predefined number of words or phrases of the document; and include the portion of the candidate document or candidate content in a body of the document.

* * * * *